United States Patent [19]

Casterline et al.

[11] 3,748,389

[45] July 24, 1973

[54] ALARM DETECTION SYSTEM

[75] Inventors: Russell Carson Casterline; William Clayton Garraty, both of Naperville; John Michael Scanlon, Winfield, all of Ill.

[73] Assignee: Bell Telephone Laboratories Incorporated, Murray Hill, N.J.

[22] Filed: Dec. 13, 1971

[21] Appl. No.: 206,995

[52] U.S. Cl. .................................................. 179/5 R

[51] Int. Cl. .......................................... H04m 11/04

[58] Field of Search ..................... 179/5 R, 5 P, 2 C, 179/1 C; 340/214, 411, 416, 276

[56] References Cited

UNITED STATES PATENTS

| | | | |
|---|---|---|---|
| 3,603,949 | 9/1971 | Walthard | 340/214 |
| 3,595,999 | 7/1971 | Cole | 179/5 P |
| 3,120,579 | 2/1964 | Stewart | 179/5 R |
| 2,911,474 | 11/1959 | Weinberg | 179/5 R |
| 3,484,553 | 12/1969 | Lovell | 179/5 R |

*Primary Examiner*—Kathleen H. Claffy
*Assistant Examiner*—David L. Stewart
*Attorney*—W. L. Keefauver et al.

[57] ABSTRACT

A telephone system which employs an alarm detection arrangement is disclosed. Each subscriber set of the telephone system includes a subscriber set switch connected between an associated pair of conductors and an alarm indicator which replaces the subscriber set switch in response to an alarm situation. A central office, which applies a first polarity of DC voltage between each pair of conductors, responds to the opening or closing of the subscriber set switch and the replacement of the subscriber set switch with the alarm indicator by reversing the voltage polarity between the conductors. When the scanner detects that the subscriber set indicated an open circuit in response to one DC voltage polarity and a closed circuit in response to the other DC voltage polarity, an alarm signal is generated.

7 Claims, 3 Drawing Figures

PATENTED JUL 24 1973 3,748,389

SHEET 2 OF 2

ALARM DETECTION SYSTEM

BACKGROUND OF THE INVENTION

1. Field of the Invention

This invention relates to alarm detection systems and more specifically to such systems for use in conjunction with communication systems.

2. Description of the Prior Art

One example of a field where there is a need for alarm detection systems is in telephone communications. Vandalism of pay telephones is a major problem to local telephone offices. Such vandalism not only results in the direct loss of money from the theft of the coins contained by a pay telephone but, more importantly, it causes a great inconvenience to prospective telephone customers who find a pay telephone out of service. Without some form of alarm systems at pay telephones, the local telephone office personnel have no way of knowing that a telephone is out of service until a routine check is made at the telephone location. This results in certain pay telephones being out of service for protracted periods of time and makes necessary the expense of routine checks by service personnel. It is, therefore, desirable to place alarm indicating devices at pay telephones to remotely indicate to the local office that a telephone has been vandalized. In addition to its use for indicating a vandalized telephone, an alarm indicator is also useful in indicating that a telephone requires routine service due, for example, to its coin box being full.

Telephone systems generally comprise a plurality of subscriber sets connected to a central office by means of individual groups of subscriber conductors associated with each subscriber set. Line scanners located at the central office apply voltage between predetermined pairs of subscriber conductors and ascertain the operating condition of each subscriber set by surveying the current flow between the conductors of each pair. The subscriber set indicates its present operating condition, which is either off-hook or on-hook, by means of a switch which allows current to flow or inhibits current flow, respectively, between the conductors of a predetermined pair. When the line scanner detects that current flow has stopped or started it initiates appropriate switching action in the central office in response to the type of change.

Prior art alarm detection systems for use with telephone systems have provided an alarm indicator at the subscriber set to be protected which generates an indication different from any indication normally produced by the subscriber set. An alarm scanner separate from the line scanners is located at the central office and periodically scans each protected line to detect and respond to alarm indications. The R. W. Deiker U.S. Pat. No. 3,387,091, granted June 4, 1968, is an example of the prior art type of alarm detection system.

In essence, alarm detection systems of the prior art type require special line scanning equipment separate from that normally used in telephone systems. This adds expense and complexity to the equipment located at a central office and limits the number of lines which can be protected. It is, therefore, desirable to provide an alarm system without the necessity of separate scanners for the detection of alarm conditions.

SUMMARY OF THE INVENTION

The present invention provides an alarm detector for use in a telephone system that eliminates the need for a separate alarm scanner. As previously indicated, a telephone system includes a plurality of subscriber sets each of which is connected to a central office by a pair of conductors. Normally the conduction characteristics of these conductor pairs are not dependent upon the polarity of the voltage applied to them. That is, for an off-hook condition at the subscriber set, a subscriber set switch which is connected between the conductors will be closed and there will be conduction over the conductor pair for any polarity of voltage applied to the conductor pair. In essence, an off-hook condition provides a closed circuit connection between the conductors of the conductor pair associated with a subscriber set. Similarly, for an on-hook condition the subscriber set switch is open, producing an open circuit between the conductors and no conduction will occur on the conductors for any polarity of voltage applied to the conductor pair. Applicants' invention indicates the existence of an alarm condition by substituting an alarm indicator, which allows unidirectional conduction over the conductor pair, for the subscriber set switch. The alarm indicator is controlled by the position of the subscriber set switch to indicate a change of position of the subscriber set switch when the alarm indicator is substituted for the subscriber set switch. The conduction state of the conductors as detected by the central office is either current flow, regardless of its direction, or the absence of current flow. The central office responds to any change in the conduction state of the conductors by reversing the polarity of a DC voltage applied to the subscriber set conductor pair. When this reversal of DC voltage polarity results in the change of the conduction state over the conductor pair, the conduction characteristics of the pair are no longer independent of the DC voltage polarity applied to them as in the normal case. The central office interprets this change in conduction characteristics as indicating that an alarm condition exists at the subscriber set. The central office responds to the existence of an alarm condition by providing an alarm signal and information identifying the subscriber set at which the alarm occurred.

BRIEF DESCRIPTION OF THE DRAWING

The invention will be more readily understood from the following description when read with reference to the drawings wherein.

GENERAL DESCRIPTION

Figure 1:
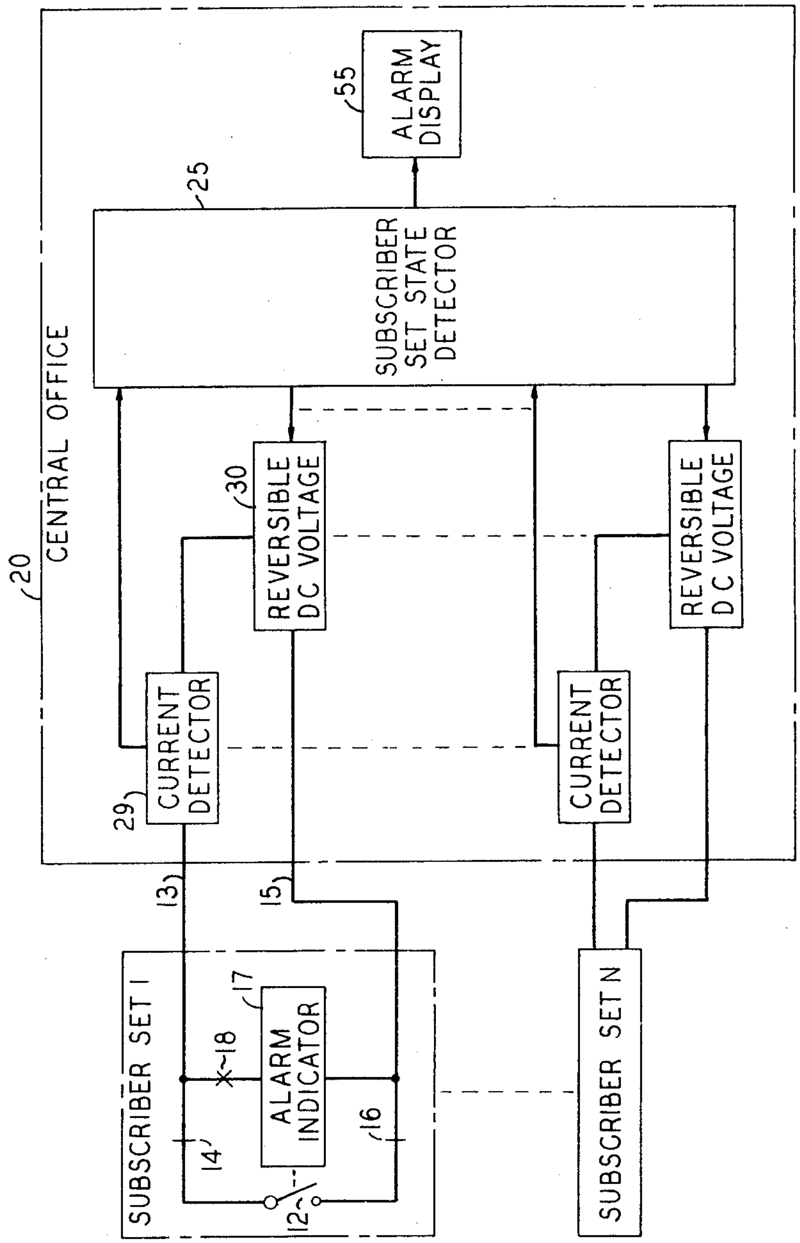
FIG. 1 is a block diagram of the present invention.

FIG. 1 is a general block diagram of a system employing the present invention. Although the invention can be used in systems having a plurality of subscriber sets, the description of its use with only subscriber set 1 clearly discloses the inventive concepts and eliminates needless redundancy. In normal operation, a reversible DC voltage source 30 applies a first polarity DC voltage between a pair of conductors 13 and 15 which connect the subscriber set 1 to the central office 20 (FIG. 1). When a subscriber set switch 12 is open, no current flows in the conductors 13 and 15 in response to the applied DC voltage since there is an open circuit between the conductors. Conversely, when switch 12 is closed, an applied DC voltage, whatever its polarity, causes a current to flow in the conductors 13 and 15 since there is a closed circuit connection between the conductors.

In addition to the switch 12, the subscriber set 1 also includes a multistate alarm indicator 17 whose state is controlled by the position of the switch 12. The alarm indicator is controlled to simulate a switch 12 position that is the opposite of the actual position of the switch. More specifically, when the switch 12 is open, the alarm indicator 17 will be in a simulated closed switch state and when the switch 12 is closed, the alarm indicator will be in a simulated open switch state. When the alarm indicator 17 is in the simulated closed switch state, and substituted for the switch 12, it will provide a closed circuit in response to the first polarity of DC voltage and an open circuit in response to a DC voltage of the opposite polarity. Alternatively, when the alarm indicator 17 is in the simulated open switch state, and substituted for the switch 12, it will provide an open circuit in response to the first polarity of DC voltage mentioned above and a closed circuit in response to the DC voltage of opposite polarity. In essence, the alarm indicator is of such a design that substituting it for the switch 12 indicates a change of state to the central office 20 and insures that conduction on the conductors 13 and 15 will be unidirectional when voltages of opposite polarity are applied to the conductors.

Upon the occurrence of an alarm situation, such as a coin box being forced open, normally closed switches 14 and 16 open and a normally open switch 18 closes. This switching action removes the switch 12 from between the conductors 13 and 15 and connects the alarm indicator between the conductors 13 and 15 such that a DC voltage of the first polarity is applied to it. When the abovementioned replacement occurs while the switch 12 is closed, current flow on the conductors 13 and 15 will stop due to the alarm indicator being in a state that simulates the opposite position of the switch 12. Alternatively, when the above-mentioned replacement occurs while the switch 12 is open, substituting the alarm indicator for the switch 12 results in current beginning to flow on the conductors 13 and 15.

A current detector 29 (FIG. 1) detects the conduction state of the conductors 13 and 15 and generates an output signal indicating either the presence of current flow on the conductors 13 and 15, regardless of its direction, or the absence of such current flow. A subscriber set state detector 25 periodically ascertains the conduction state of the conductors 13 and 15 by checking the signals generated by the current detector 29. The time between periodic checks of the current flow detector is called a scan period. Each time the conduction state on the conductors 13 and 15 changes from one scan period to the next, the subscriber set state detector 25 generates a signal indicating a change in conduction state to which the reversible DC voltage source 30 responds by reversing the polarity of the DC voltage between the conductors 13 and 15 for one scan period. When current flows on the conductors 13 and 15 in response to one polarity of DC voltage and no current flows on the conductors 13 and 15 in response to the opposite DC voltage polarity, indicating an alarm condition, an alarm signal is generated by the subscriber set state detector 25. However, no alarm signal is generated when current flows on the conductors 13 and 15 in response to both DC voltage polarities or when no current flows on the conductors 13 and 15 in response to both DC voltage polarities. It will be recalled that these two conditions indicate the normal off-hook or on-hook position of the switch 12.

The foregoing has generally described the operation of a telephone system using applicants' invention and may be summarized as follows. In the situation where no alarm condition exists, the conduction characteristics of the subscriber set conductors 13 and 15 will be determined by the switch 12 and these characteristics will be independent of the polarity of the voltage applied to the conductors at the central office. When an alarm condition occurs, the alarm indicator 17 is substituted for the switch 12 and it changes both the conduction state on the conductors 13 and 15 and the conduction characteristics of the conductors. When the alarm indicator 17 is connected between the conductors, conduction on these conductors is dependent upon the polarity of the voltage applied at the central office 20. Any time there is an indication of a change in state of the subscriber set 1, the central office reverses the polarity of the voltage applied to the conductors, interpreting a change in the conduction state of the conductors in response to the voltage reversed as an indication that the alarm indicator is connected between the conductors due to an alarm condition.

DETAILED DESCRIPTION

Figure 2:
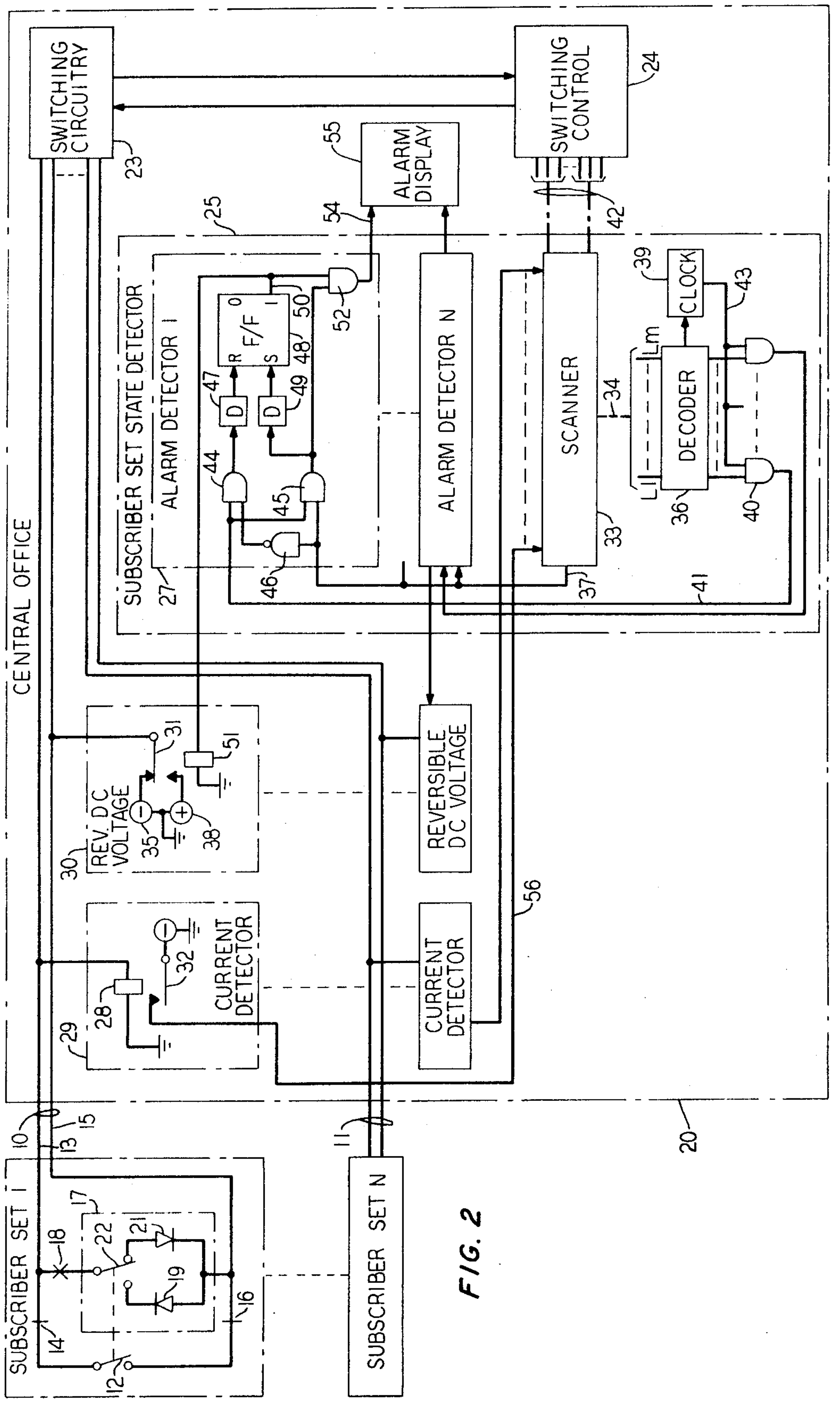
FIG. 2 is a more detailed diagram of a telephone system employing the invention.

The following discussion is provided to facilitate a more detailed understanding of the invention. A more detailed schematic block diagram of a system utilizing the invention, including illustrative circuitry for implementing the invention, is shown in FIG. 2. A detailed understanding of the invention is most easily conveyed by describing its operation in terms of specific examples.

The following example describes the operation of a telephone system employing the present invention starting at a time when subscriber set 1 (FIG. 2) is on-hook and no alarm situation has the occurred. In the on-hook condition, a switch 12 is open and no current is flowing in conductors 13 and 15. When the handset is taken off-hook, the switch 12 closes. A current then flows through the conductors 13 and 15 and the relay coil 28, in response to a negative voltage source 35. Current flowing through the relay coil 28 closes the relay contact 32. The closing of relay contact 32 applies a negative voltage to the scanner 33 via conductor 56. The scanner 33 is of the type disclosed in the U. F. Gianola et al. U.S. Pat. No. 3,430,001 issued Feb. 25, 1969. This scanner 33 periodically compares the present state of a given subscriber set, which is indicated by the presence or absence of a negative voltage on the conductor 56, with the state of the same subscriber set during the previous comparison. At the same time the comparison for a given subscriber set is occurring, the scanner 33 transmits an address identifying the given subscriber set on conductor 34. When the scanner 33 detects that the subscriber set 1 has changed state since the preceding comparison for that subscriber set, a logical "1" is transmitted on conductor 37. Further, each time a logical "1" is transmitted on conductor 37, a signal indicating the change of state and the subscriber set at which the change of state occurred is transmitted via a pair of conductors 42 to the switching control 24. The switching control 24 responds to inputs on the pair of conductors 42 by controlling switch operations at the switching circuitry 23. The switching circuitry 23, the switching control 24, and the control of the switching circuitry 23 by the switching control 24 are all well known in the art.

Figure 3:
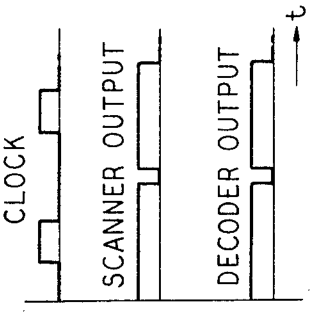
FIG. 3 illustrates the timing relationships described with reference to the invention.

The scanner 33, operating as described above, will detect the on-hook to off-hook transition of subscriber set 1 and transmit a logical "1" on conductor 37 at the same time the address of subscriber set 1 is transmitted on conductor 34. A decoder 36 responds to the address of subscriber set 1 on conductor 34 by applying a logical "1" to AND gate 40 which is associated with the alarm detector 27. A clock 39 operates in synchronism with the decoder 36 and generates a logical "1" pulse on conductor 43 each time the decoder responds to an address on conductor 34. The time relationship between the outputs of the clock 39, the outputs of the scanner 33 on conductor 37, and the outputs of the decoder 36 are shown in FIG. 3.

The AND gate 40 responds to the logical "1" pulse from the clock 39 and the logical "1" from the decoder 36 by transmitting a logical "1" to the AND gates 44 and 45 via a conductor 41. The AND gate 45 responds to the logical "1" from the AND gate 40 and the logical "1" conductor 37, which indicates that the conduction state of the subscriber set 1 has changed, by generating a logical "1" output. Due to the operation of an inverter 46, the output of the AND gate 44 is a logical "0" in response to the logical "1" from the AND gate 40 and the logical "1" on conductor 37.

An alarm AND gate 52 receives as inputs the output of AND gate 45 and the set output of a flip-flop 48. The output of flip-flop 48 indicates whether a change in conduction state occurred at subscriber set 1 during the preceding scan period. The flip-flop 48 applies a logical "1" to the alarm AND gate 52 when a change of state occurred during the preceding scan period for subscriber set 1 or, alternatively, a logical "0" when no such change of state occurred. Since in this example no change of state occurred during the preceding scan period for subscriber set 1, the alarm AND gate 52 receives a logical "0" from flip-flop 48 and the logical "1" from AND gate 45. This combination of inputs results in a logical "0" output from AND gate 52 indicating that no alarm condition exists.

The logical "1" output of AND gate 45 is also transmitted via a delay element 49 to the set input of the flip-flop 48. The flip-flop 48 responds to the logical "1" input at its set input by generating a logical "1" output on a conductor 50. The delay element 49 provides a time delay of greater duration than the duration of the pulse from the clock 39. Therefore, the output of AND gate 45 has returned to a logical "0" before the flip-flop 48 is set. The output of flip-flop 48 is also applied to a relay coil 51. When the flip-flop 48 is set to generate a logical "1" output, as in the present example, the relay coil 51 is energized. A relay armature 31 operates in response to the energized relay coil 51 to remove the negative voltage 35 from conductor 15 and apply a positive voltage 38 to the conductor 15.

In the case being discussed, reversing the potential applied to the conductor 15 does not result in the termination of conduction through the conductors 13 and 15. Since it has been assumed that the subscriber handset is off-hook, resulting in the switch 12 being closed, there is a path for current flow from the positive voltage 38 through the relay coil 28 to ground. This current flow activates the relay coil 28, causing the relay contacts 32 to again apply a negative voltage to the scanner 33. Since the scanner 33 received indications of current flow on the conductors 13 and 15 during both the preceding scan period and the present scan period, no change of state is detected and a logical "0" is transmitted on the conductor 37 when the address identifying subscriber set 1 is transmitted on conductor 34. When the logical "1" from AND gate 40 is transmitted to the AND gates 44 and 45, the output of AND gate 45 becomes a logical "0" and the output of AND gate 44 becomes a logical "1" in response to the logical "0" on conductor 37. At this time the alarm AND gate 52 receives as inputs a logical "0" output of AND gate 45 and the logical "1" output of flip-flop 48. The flip-flop 48 has a logical "1" output since a change of conduction state was detected for the subscriber set 1 during the preceding scan period. This combination of inputs to AND gate 52 results in a logical "0" output which indicates that no alarm condition exists. The logical "1" output of AND gate 44 is transmitted via delay element 47, which has the same delay properties as the delay element 49, to the reset input of flip-flop 48. The flip-flop 48 responds to the logical "1" at its reset input by changing state and generating a logical "0" output on conductor 50. Relay coil 51 responds to the logical "0" output of the flip-flop 48 by becoming deenergized which results in the relay contact 31 removing the positive voltage 38 from conductor 15 and reapplying the negative voltage 35 to conductor 15.

The following is a summary of the above discussion describing the operations performed by a telephone system employing the present invention in response to a normal transition of on-hook to off-hook. When the handset of the subscriber set 1 goes off-hook, the switch 12 closes, providing a path for current flow from the negative voltage source 35 through the conductors 13 and 15. The central office detects the change from no current flow to current flow and reverses the polarity of the voltage applied to the conductors 13 and 15. Current continues to flow through the conductors after the voltage polarity is reversed, indicating to the central office that there is a true off-hook condition at the subscriber set as opposed to an alarm condition. It will be noted that the appearance of a closed circuit across the conductors 13 and 15 is interpreted by the central office as a true off-hook condition.

The response of the scanning arrangement for a change from off-hook to on-hook is essentially identical to its response to the previously described on-hook to off-hook transition, the only difference in response is that the scanner 33 detects a change from current flow to no current flow rather than the opposite change. In this case, when the central office reverses the polarity of the voltages applied to the conductors 13 and 15, there will still be no current flow. In essence, the central office interprets this open circuit condition in response to both voltage polarities as a true on-hook signal.

When an alarm situation, such as the removal of a telephone coin box, occurs at the subscriber set, the normally closed switches 14 and 16 open, removing the switch 12 from between conductors 13 and 15 and a normally open switch 18 closes, connecting an alarm indicator 17 between the conductors. The alarm indicator 17 includes a switch 22 which is controlled by the position of the switch 12. This control is such that when an alarm situation occurs, and the switch 12 is open due to the on-hook condition of the subscriber set, the switch 22 connects the anode of a diode 21 to conductor 13 via the then closed switch 18. The cathode of diode 21 is directly connected to conductor 15. Alternatively, when an alarm situation occurs and the switch 12 is closed due to the off-hook condition of subscriber set 1, the switch 22 connects the cathode of a diode 19 to conductor 13 via the then closed switch 18. The anode of diode 19 is directly connected to conductor 15. In essence, replacing the switch 12 with the alarm indicator 17 simulates a change in the state of the subscriber set and insures that conduction on the conductors will be unidirectional. This condition, indicating an alarm condition, is different than either the true on-hook condition which appears as an open circuit to both polarities of DC voltage or a true off-hook which appears as a closed circuit to both polarities of DC voltage.

The following example illustrates the response of a telephone system employing the present invention to the occurrence of an alarm condition. The example starts at a time when the handset is on-hook and no change of state has occurred during the previous scan period. With the handset in this position, the switch 12 is open and no current is flowing between the conductors 13 and 15. Upon the occurrence of an alarm situation, the switch 12 is removed from between the conductors 13 and 15 and the anode of diode 21 is connected to conductor 13 via the switches 22 and 18. It will be recalled that the diode 21 is inserted between the conductors 13 and 15 to provide a unidirectional conduction path which indicates to the central office that an alarm condition exists. Since conductor 15, by operation of the relay armature 31, is negative with respect to conductor 13, the diode 21 is forward biased and a current begins to flow between the conductors 13 and 15 simulating a change in the position of the switch 12. Thus, the relay coil 28 is energized and the relay contacts 32 close, applying a negative voltage to the scanner 33.

As previously described, the scanner 33 transmits a logical "1" on the conductor 37 when the present conduction state of the conductors 13 and 15, which is indicated by the presence or absence of a negative voltage from the relay contact 32, is different from the conduction state on the conductors 13 and 15 during the previous scan period. Since, in this example, no current was flowing on the conductors 13 and 15 due to the open switch 12 during the previous scan period and a current is presently flowing on the conductors 13 and 15 due to the alarm indicator 17, the scanner 33 transmits a logical "1" on conductor 37. When the logical "1" is transmitted from the AND gate 40 to the AND gates 44 and 45, in the manner previously described, the output of the AND gate 45 becomes a logical "1" in response to the logical "1" on conductor 37.

It will be recalled that the flip-flop 48 generates a logical "1" output on the conductor 50 when a change of state occurred during the preceding scan period and it generates a logical "0" output when no such change of state occurred. Since, in this example, no change of state occurred during the preceding scan period, the output of flip-flop 48 is a logical "0" at the time the "1" is applied to the delay element 49. The alarm AND gate 52, therefore, receives as inputs the logical "1" output of AND gate 45, and the logical "0" output of flip-flop 48. This combination of inputs to AND gate 52 does not result in the generation of an alarm signal during this scan of the subscriber set 1 lines. The flip-flop 48 is set by the logical "1" output of AND gate 45 after the time delay provided by the delay element 49. The logical "1" output on the set side of the flip-flop 48 energizes the relay coil 51 and the relay armature 31 responds to the energization of the relay coil 51 by removing the negative voltage 35 from conductor 15 and applying the positive voltage 38 to conductor 15. The conductor 15 is now positive with respect to the conductor 13. Therefore, the diode 21 is reverse biased and no current flows in the conductors 13 and 15 since the insertion of the alarm indicator between these conductions makes conduction over them unidirectional. This condition simulates another change in the position of the switch 12. The relay contact 32 responds to the termination of current flow by opening. During the next scan period for subscriber set 1, the simulated change of state is detected for this subscriber set since a condition of current flow existed during the preceding scan period and a condition of no current flow now exists.

It will be recalled that this condition, produced by making conduction over the conductors 13 and 15 unidirectional, is interpreted by the central office as indicating an alarm condition. In response to this second change of state, the scanner 33 generates a logical "1" on conductor 37. When AND gates 44 and 45 receive the logical "1" from AND gate 40, in the manner previously described, the output of AND gate 45 becomes a logical "1" in response to the logical "1" on conductor 37. The alarm AND gate 52 then receives as inputs a logical "1" from the output of AND gate 45 and a logical "1" output from flip-flop 48. This combination of inputs to the alarm AND gate 52 results in the transmission of a logical "1" to an alarm display unit 55 via conductor 54. The alarm display unit 55 receives separate inputs from the alarm AND gates associated with each of the subscriber sets. In response to a logical "1" input, the alarm display unit 55 produces an indication of alarm and an indication of the subscriber set from which the alarm signal originates. The alarm display unit could consist of any one of a number of well known typewriter output stations commonly used in conjunction with electronic systems.

The response of the scanning arrangement to alarm situations which occur when the subscriber set is off-hook are essentially identical to those described above. In this case, however, a reverse biased diode 19 (FIG. 2), instead of diode 21, is substituted for a closed switch 12 when the alarm situation occurs. This substitution causes a change from current flow to no current flow on the conductors 13 and 15 simulating an on-hook position of the switch 12. In response to this simulated change in the position of switch 12, the voltage applied to conductor 15 is reversed in the same manner described above. With the reversal of voltage, the diode 19 becomes forward biased and a current begins to flow between conductors 13 and 15. The scanner 33 will respond to the change from no current flow to current flow on the conductors 13 and 15 by generating the second change of state indication in succession on conductor 37. By the means described above the alarm AND gate 52 responds to the two changes of state in succession by generating an alarm signal.

In essence, the foregoing detailed description of the invention illustrates how applicants' invention converts the normally voltage polarity independent conducting characteristics of the path between a subscriber set and a central office to unidirectional conduction characteristics when an alarm condition occurs. The central office interprets a unidirectional conduction path between it and the subscriber set as indicating that an alarm condition exists and, in response to this indication, provides an alarm and information identifying the appropriate subscriber set.

The foregoing has described the applicants' novel alarm detecting arrangement for operation in conjunction with a telephone system. It is to be understood that the above-described arrangements are illustrative of the principles of the invention. Numerous other arrangements may be devised without departing from the scope of the invention.

What is claimed is:

1. In combination;

a signaling means for selectively applying a voltage polarity independent low impedance between a pair of conductors to which a first polarity of DC voltage is applied or a voltage polarity independent high impedance between said pair of conductors;

an alarm indicator exhibiting a low impedance in response to one DC voltage polarity and a high impedance in response to the other DC voltage polarity;

means responsive to the occurrence of an alarm situation for replacing said signaling means between said conductors with said alarm indicator;

means responsive to said signaling means for controlling said alarm indicator to provide an impedance between said conductors in response to said first DC voltage polarity substantially opposite to the impedance provided by said signaling means at the time of said replacement; and circuitry responsive to changes in impedance between said conductors for applying a detection signal between said conductors to determine if said change in impedance was caused by the substitution of said alarm indicator for said signaling means.

2. The combination in accordance with claim 1 wherein said circuitry includes a means responsive to changes in impedance between said conductors for removing the first polarity of DC voltage applied between said conductors and applying a second polarity of DC voltage between said conductors.

3. The combination of claim 2 wherein said circuitry includes a means for generating an alarm signal each time the impedance between said conductors in response to said second polarity DC voltage is different than the impedance between said conductors in response to said first DC voltage polarity.

4. In combination;

a plurality of signaling means for selectively applying a voltage polarity independent low impedance between an associated pair of conductors to which a first polarity DC voltage is applied or a voltage polarity independent high impedance between said associated pair of conductors;

an alarm indicator associated with each of said signaling means exhibiting a low impedance in response to one polarity of DC voltage and a high impedance in response to the other polarity of DC voltage;

means responsive to the occurrence of an alarm situation for replacing said signaling means between a predetermined pair of conductors with said associated alarm indicator;

means responsive to each of said signaling means for controlling said associated alarm indicator to provide an impedance between said predetermined conductors in response to said first polarity of DC voltage substantially opposite to the impedance provided by said signaling means at the time of said replacement; and circuitry responsive to changes in impedance between said predetermined pair of conductors for applying a detection signal between said predetermined pair of conductors to determine if said change in impedance was caused by the substitution of said alarm indicator for said signaling means.

5. The combination in accordance with claim 4 wherein said circuitry includes a means for removing said first polarity of DC voltage from between said predetermined pair of conductors and connecting a second polarity of DC voltage between said predetermined pair of conductors in response to a change in impedance between said predetermined pair of conductors.

6. The combination in accordance with claim 5 wherein said circuitry includes a means for generating an alarm signal each time the impedance between said predetermined pair of conductors in response to said second polarity of DC voltage is different than the impedance between said predetermined pair of conductors in response to said first polarity of DC voltage.

7. An alarm protected telephone system comprising;

a subscriber set including a switch for selectively applying voltage polarity independent low impedance between a pair of conductors to which a first polarity of DC voltage is applied or a voltage polarity independent high impedance between said pair of conductors;

an alarm indicator exhibiting a low impedance in response to one polarity of DC voltage and a high impedance in response to the other polarity of DC voltage;

means responsive to the occurrence of an alarm situation for replacing said switch between said conductors with said alarm indicator;

means responsive to said switch for controlling said alarm indicator to provide an impedance between said conductors in response to said first polarity of DC voltage substantially opposite to the impedance provided by said switch at the time of said replacement;

means responsive to changes in impedance between said conductors for replacing said first polarity of DC voltage between said conductors with a second polarity of DC voltage; and means for generating an alarm signal each time the impedance between said conductors in response to said second polarity of DC voltage is different than the impedance between said conductors in response to said first polarity of DC voltage.

* * * * *